(12) United States Patent
Goetheer et al.

(10) Patent No.: US 12,054,835 B2
(45) Date of Patent: Aug. 6, 2024

(54) METHOD FOR ELECTROCHEMICALLY REDUCING CARBON DIOXIDE

(71) Applicant: Nederlandse Organisatie voor toegepast-natuurwetenschappelijk onderzoek TNO, The Hague (NL)

(72) Inventors: Earl Lawrence Vincent Goetheer, Mol (BE); Roman Latsuzbaia, Delft (NL); Anca Anastasopol, Pijnacker (NL); Cornelis Petrus Marcus Roelands, Voorschoten (NL); Roel Johannes Martinus Bisselink, Kleve (DE)

(73) Assignee: Nederlandse Organisatie voor toegepast-natuurwetenschappelijk onderzoek TNO, The Hague (NL)

( * ) Notice: Subject to any disclaimer, the term of this patent is extended or adjusted under 35 U.S.C. 154(b) by 942 days.

(21) Appl. No.: 16/976,688

(22) PCT Filed: Mar. 4, 2019

(86) PCT No.: PCT/NL2019/050134
§ 371 (c)(1),
(2) Date: Aug. 28, 2020

(87) PCT Pub. No.: WO2019/172750
PCT Pub. Date: Sep. 12, 2019

(65) Prior Publication Data
US 2021/0047743 A1 Feb. 18, 2021

(30) Foreign Application Priority Data
Mar. 5, 2018 (EP) .................................... 18159946

(51) Int. Cl.
*C25B 3/26* (2021.01)
*B01D 53/14* (2006.01)
(Continued)

(52) U.S. Cl.
CPC ............ *C25B 3/25* (2021.01); *B01D 53/1425* (2013.01); *B01D 53/1475* (2013.01);
(Continued)

(58) Field of Classification Search
CPC ....................................................... C25B 3/26
(Continued)

(56) References Cited

U.S. PATENT DOCUMENTS

2008/0296146 A1    12/2008  Toulhoat et al.
2012/0298522 A1 *  11/2012  Shipchandler ............ C25B 1/00
                                                                    204/275.1
(Continued)

FOREIGN PATENT DOCUMENTS

CN      102 240 497 A       11/2011
CN      102240497 A    *    11/2011    ............. B01D 53/18
JP      2014-520959 A        8/2014

OTHER PUBLICATIONS

Diaz et al., "Electrochemical Production of Syngas from CO2 Captured in Switchable Polarity Solvents," Green Chemistry (2018), vol. 20, No. 3, pp. 620-626. (Year: 2018).*
(Continued)

*Primary Examiner* — Edna Wong
(74) *Attorney, Agent, or Firm* — Studebaker & Brackett PC

(57) ABSTRACT

The disclosure is directed to a method for in-situ extracting a reduced carbon dioxide product or product mixture in an electrochemical cell, and the use of a three-compartment electrochemical cell for in-situ extraction of organic carboxylic acids such as formic acid, acetic acid, oxalic acid, glycolic acid, tartaric acid, malonic acid, propionic acid, glyoxylic acid, and/or salts thereof.

21 Claims, 3 Drawing Sheets

(51) Int. Cl.
*C25B 1/00* (2021.01)
*C25B 3/25* (2021.01)
*C25B 9/23* (2021.01)
*C25B 15/08* (2006.01)
*C25B 9/73* (2021.01)

(52) U.S. Cl.
CPC ............ *B01D 53/1493* (2013.01); *C25B 1/00* (2013.01); *C25B 9/23* (2021.01); *C25B 15/08* (2013.01); *B01D 2252/102* (2013.01); *B01D 2252/20484* (2013.01); *B01D 2252/40* (2013.01); *C25B 9/73* (2021.01)

(58) Field of Classification Search
USPC .................................. 205/555, 440, 450, 462
See application file for complete search history.

(56) References Cited

U.S. PATENT DOCUMENTS

| | | |
|---|---|---|
| 2013/0008800 A1 | 1/2013 | Lakkaraju et al. |
| 2014/0151240 A1* | 6/2014 | Bedell ................ B01D 53/1475 |
| | | 205/462 |
| 2014/0183038 A1 | 7/2014 | Lakkaraju et al. |
| 2017/0037522 A1* | 2/2017 | Kaczur .................... C25B 9/19 |

OTHER PUBLICATIONS

Merino-Garcia et al., "Electrochemical Membrane Reactors for the Utilisation of Carbon Dioxide," Chemical Engineering Journal (Dec. 1, 2016), vol. 305, pp. 104-120. (Year: 2016).*

Yang et al., "Electrochemical Conversion of $CO_2$ to Formic Acid Utilizing Sustainion™ membranes. Journal of CO2 Utilization," (Jul. 1, 2017), vol. 20, pp. 208-217. (Year: 2017).*

Yang et al., "Electrochemical conversion of CO2 to formic acid utilizing Sustainion(TM) membranes", Journal of CO2 Utilization, (2017), vol. 20, pp. 208-217.

* cited by examiner

METHOD FOR ELECTROCHEMICALLY REDUCING CARBON DIOXIDE

CROSS-REFERENCE TO RELATED APPLICATIONS

This application is the U.S. National Stage of International Application No. PCT/NL2019/050134 filed Mar. 4, 2019, which claims benefit of priority to European Patent Application No. 18159946.5 filed Mar. 5, 2018, the entire contents of which are incorporated herein by reference.

The invention is directed to a method for electrochemically reducing carbon dioxide into a reduced carbon dioxide product or product mixture and in-situ extracting the reduced carbon dioxide product or product mixture in an electrochemical cell, and the use of a three-compartment electrochemical cell for in-situ extraction of organic carboxylic acids, such as formic acid, acetic acid, oxalic acid, glycolic acid, tartaric acid, malonic acid, propionic acid, glyoxylic acid, and/or salts thereof.

The reduction of carbon dioxide emissions is considered to be a major societal challenge. Until recent years, most attention has been paid to carbon capture and storage, which intends to concentrate carbon dioxide and store it in geological sites. This process, however, has several adverse consequences, one of which is failing to acknowledge the value carbon dioxide has as a renewable material.

Emerging technologies encompass utilising carbon dioxide through its transformation into high value-added products such as chemical feedstocks, synthetic fuels and building materials. Currently, the majority of organic chemicals is derived from fossil-based material (or fossil carbon). By converting carbon dioxide, fossil-based materials become less important and carbon dioxide becomes more important as a carbon source.

Such exemplary emerging technologies convert carbon dioxide into economically valuable chemical compounds, such as carbon monoxide, methane, ethylene, alcohols (e.g. methanol and ethanol), and carboxylic acids (e.g. formic acid, acetic acid, glycolic acid, glyoxylic acid, and oxalic acid).

One of the most promising carbon dioxide conversion techniques is direct heterogeneous electrochemical reduction (or electroreduction).

Electroreduction technologies have economical potential to recycle carbon dioxide as an energy carrier, thereby reducing its accumulation in the atmosphere, and storing energy in higher value and higher energy density (chemical) form.

Current technologies embody elaborate processes, consisting of multiple sequential steps. These steps concern carbon dioxide capture, carbon dioxide release upon applying heat followed by purification, recovery of the carbon capture solvent, solubilising carbon dioxide in aqueous or non-aqueous electrolytes, and electrochemically converting solubilised carbon dioxide to high value-added chemicals. Regeneration of the carbon capture solvent according to above process requires the application of heat, thus results in an increased energy consumption. By subjecting the capture solvent to elevated temperatures, the solvent may become instable leading to adversely influencing the process.

Methods for capturing carbon dioxide may include the use of chemical and/or physical solvents, or hybrids thereof. In general, carbon dioxide capture is performed under low pressure and with low concentration carbon dioxide gas streams. Common encountered chemical solvent systems are aqueous and comprise alkanolamines (e.g. monoethanolamine, N-methyldiethanolamine and diglycolamine). Other chemical solvents include diethanolamine, diisopropanolamine, and aminomethylpropanol. Typical solvents systems comprise 10-35% by total weight of monoethanolamine, 25-35% by total weight of diethanolamine, 30-50% by total weight of diisopropanolamine or N-methyldiethanolamine, and/or 40-70% by total weight of diglycolamine. These species chemically react with carbon dioxide, albeit present in a gas stream, to form carbamates, carbonates or bicarbonates. Once carbon dioxide is absorbed the application of heat releases the carbon dioxide, which can be stored or converted to other chemicals. Therewith, the capture solvent is regenerated.

Current technologies make use of low concentration carbon dioxide absorbents, resulting in slow reaction kinetics, and inefficient and expensive carbon dioxide reduction process. Consequently, a low concentration carbon dioxide absorbent feed results in a low product concentration, leading to relatively expensive product separation.

Some examples that use chemical solvents in electroreducing carbon dioxide include the following.

For example, Rheinhardt et al. (*ACS Energy Lett.* 2017, 2(2), 454-461) report multiple electrochemical processes that drive the capture and release reactions of carbon dioxide. However, Rheinhardt et al. do not suggest the conversion of captured carbon dioxide. In addition, a three-compartment electrochemical cell is not reported. Therefore, expensive equipment is necessary for regeneration of the absorbent.

Chen et al. (*ChemSusChem* 2017, 10(20), 4109-4118) report the electrochemical reduction of carbon dioxide in a monoethanolamine capture medium, resulting in carbon monoxide and formate ions. However, Chen et al. do not suggest product separation. According to Chen et al. the product distribution is highly dependent on the metal electrode use.

Besides using chemical solvents in the electrochemical reduction process of carbon dioxide, following examples include the use of a physical solvent.

Kaneco et al. (*Chem. Eng. J.* 2007, 128(1), 47-50) report the electrochemical reduction of carbon dioxide in the Rectisol™ solvent into a mixture of products, not mentioning or suggesting a preferred product. The parameters temperature and pressure are not reported by Kaneco et al.

Yang et al. (*J. $CO_2$ Util.* 2017, 20, 208-217) report a three-compartment electrochemical cell, wherein the center compartment is designated for extraction of formic acid. However, Yang et al. do not report feeding a capture solvent stream concentrated with carbon dioxide into the electrochemical cell nor do they report performing the reaction from the capture solvent, utilising concentrated carbon dioxide stream or regenerating the capture solvent.

Similarly, US-A-2017/0,037,522 discloses a three-compartment electrochemical cell for conversion of gaseous carbon dioxide to formic acid. However, reduction of carbon dioxide in an absorbent is not reported.

In US-A-2008/0,296,146, a carbon sequestration process is reported, in which carbon dioxide is reduced in an aprotic medium, followed by mineralization of the products.

US-A-2014/0,183,038 describes a system for electrochemical reduction of carbon dioxide in a two-compartment electrochemical cell.

There is a need to convert carbon dioxide into carboxylic acids (e.g. formic acid and oxalic acid) in an electrochemical cell without having to concentrate and purify the carbon dioxide feed. In addition, it is desirable to ease the regeneration of the absorbent, and to reduce processing costs by in-situ production of high concentrated carboxylic acid feeds for commercial use.

An objective of the invention is to overcome one or more of the disadvantages faced in the prior art.

A further objective of the invention is to provide a cost and energy efficient method for electrochemically reducing carbon dioxide.

Yet a further objective of the invention is to provide a method for convenient in-situ extraction of carboxylic acids in a three-compartment electrochemical cell.

Yet a further objective of the invention is to provide a method for electrochemically reducing carbon dioxide from a carbon dioxide-rich absorbent, wherewith the carbon dioxide is absorbed to a physical solvent.

Yet a further objective of the invention is to provide a method for electrochemically reducing carbon dioxide from a carbon dioxide-rich absorbent, wherewith the carbon dioxide is absorbed to a chemical solvent.

The inventors found that one or more of these objectives can, at least in part, be met by using a electrochemical cell having at least three compartments wherein carbon dioxide can be reduced and wherein a reduced carbon dioxide product or product mixture can be extracted.

Accordingly, in a first aspect the invention provides a method for electrochemically reducing carbon dioxide into a reduced carbon dioxide product or product mixture and in-situ extracting a reduced carbon dioxide product or product mixture in an electrochemical cell, comprising:
  a) introducing carbon dioxide-rich absorbent into a cathode compartment of an electrochemical cell;
  b) applying an electrical potential between an anode and a cathode in the electrochemical cell sufficient for the cathode to reduce carbon dioxide into a reduced carbon dioxide product or product mixture in the carbon dioxide-rich absorbent, thereby providing a carbon dioxide-poor absorbent, and
  c) collecting reduced carbon dioxide product or product mixture via in-situ extraction,
wherein the anode is separated from the cathode by more than one separator.

The method of the invention allows carbon dioxide to be captured by an absorbent and electrochemically reduced from a carbon dioxide-rich absorbent without having to lower the operating pressure and/or applying heat. Carbon dioxide may be captured by an absorbent and directly reacted in the electrochemical cell, wherewith the electrochemical cell acts both as a reactor and absorbent regeneration unit. Capturing and electrochemically reducing carbon dioxide may be performed with the same fluid medium, resulting in a cost and energy efficient process. Carbon dioxide may be electrochemically converted to valuable chemical compounds such as formic acid and oxalic acid, and/or salts thereof. Formed high value-added chemical compounds are in-situ extracted in the electrochemical cell wherewith the electrochemical conversion of carbon dioxide can be a continuous process. The invention further allows electrochemical conversion of carbon dioxide without having to purify the carbon dioxide feed.

Figure 1:
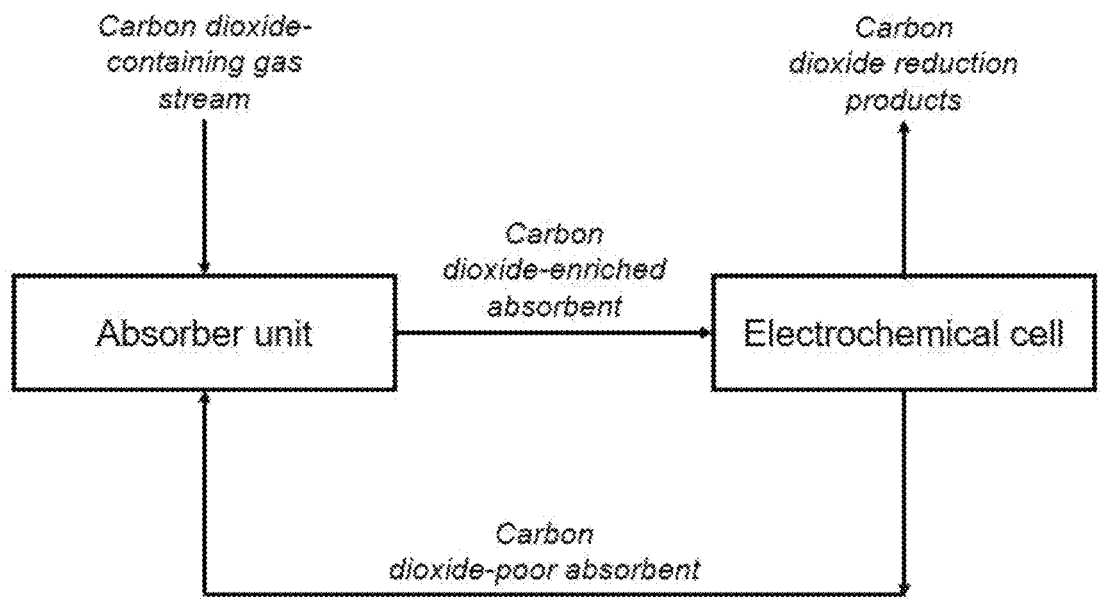
FIG. 1 depicts the first three steps of one embodiment of this disclosure.

Steps a)-c) are schematically illustrated in detail in FIG. 1. Carbon dioxide-rich absorbent is introduced into a cathode compartment of an electrochemical cell. The electrochemical cell may be designed in such a way that both an anode compartment and a cathode compartment are present, which are separated from one another by more than one separator. The separator is preferably a membrane.

The separator may comprise a bipolar membrane, an ion exchange membrane, a cation exchange membrane, an anion exchange membrane, a charge-mosaic membrane, or a layered mixture of anion and cation exchange resins. A bipolar membrane is defined as a synthetic membrane comprising two oppositely charged ion-exchanging layers that are in contact with each other. An ion exchange membrane is defined as a membrane which may permit the exchange of anions and/or cations between both sides of the membrane. A cation exchange membrane is defined as a synthetic membrane comprising fixed anionic groups with predominantly mobile cations. An anion exchange membrane is defined as a synthetic membrane comprising fixed cationic groups with predominantly mobile anions. A charge-mosaic membrane is defined as a membrane having a charge structure comprised of cation-exchange domains and anion-exchange domains which are alternately aligned and each of which penetrates the membrane from one side to the other side. The separator may also be a (semi-)permeable layer confining a mixture of a cation exchange resin and an anion exchange resin. Preferably, the separator comprises an anion exchange membrane, a cation exchange membrane, and/or a glass frit. When an anion exchange membrane is used, it is preferred to locate the anion exchange membrane next to a cathode. When a cation exchange membrane is used, it is preferred to position the cation exchange membrane next to an anode.

The economic viability of the method according to the invention can be optimised by improving the Faradaic conversion efficiency for the desired reduced carbon dioxide product or product mixture, sufficient high current density (reaction rate), and minimal over potential. In order to calculate the Faradaic efficiency, the number of electrons transferred, total amount of the used carbon dioxide or produced carbon dioxide reduction product, and amount of charge passed through the electrochemical cell are required.

A suitable way of enhancing the efficiency, is by improving catalytic activity, reducing over potential and improving the surface area of the anode and/or cathode. The surface area may be 1-200 $m^2/g$ for a catalyst or 1-250 $m^2/g$ for a catalyst support. The surface area is defined as the total surface area of a material per unit of mass. The advantage in using a high electrode surface area is that the current flow increases. Typically, catalysts have surface area of 20-100 $m^2/g$ for metal catalysts and 5-250 $m^2/g$ for activated carbon supports. For most applications, a high surface area is preferred. However, a high surface area at the same time leads to a lower stability of materials. Therefore, an optimum can be reached for each material.

The surface structure of the anode and/or cathode may have a void volume in the range of 1-99% by total volume. The void volume percentage refers to the percentage of "empty space" that the electrode is not occupying of its total volume space. The void volume has influence on the pressure drop of the electrode for liquid flow through its structure. In general, the higher the void volume, the lower the pressure drop. In particular, the void volume of the anode and/or cathode may be 98 vol. % or less, 5 vol. % or more, 10 vol. % or more, 15 vol. % or more, 20 vol. % or more, 25 vol. % or more, 30 vol. % or more, 35 vol. % or more, or 40 vol. % or more. Preferably, the void volume of the anode and/or cathode is 30-98 vol. %. Low void volume, or low porosity of material, undesirably leads to lower surface area and higher material costs.

In order to improve the mechanical properties of the electrochemical cell, the separator may be mechanically supported.

The separator may be in direct electrical contact with the cathode and/or anode of the electrochemical cell. The separator may be hot-pressed onto the cathode and/or anode of the electrochemical cell. Alternatively, the separator may be in indirect electrical contact with the cathode and/or anode of the electrochemical cell via an electrically conductive substance, such as an electrolyte, or more specifically a catholyte or anolyte. Preferably, the distance between the separator and cathode and anode is minimal, or the separator is in direct contact with the cathode and anode in order to minimise electrical resistance.

The electrochemical cell as used in this invention is preferably a three-compartment electrochemical cell as the extraction of a collected reduced carbon dioxide product or product mixture may be simplified. This simplification, or ease of handling, additionally allows operating the method of the invention in a semi-continuous or continuous manner, as multiple processes may occur within the electrochemical cell. By employing an electrochemical cell having at least three compartments, the additional third compartment (i.e. preferably the center of three compartments) may comprise different conditions compared to the anodic and/or cathodic compartment. Furthermore, the third compartment may be used to extract conversion product(s) without affecting processes in the anodic and/or cathodic compartment. In particular, introducing carbon dioxide-rich absorbent into the cathode compartment of the electrochemical cell may not adversely affect carbon dioxide conversion reactions and/or other reaction processes taking place within the electrochemical cell, nor may hinder regeneration of the absorbent.

Figure 2:
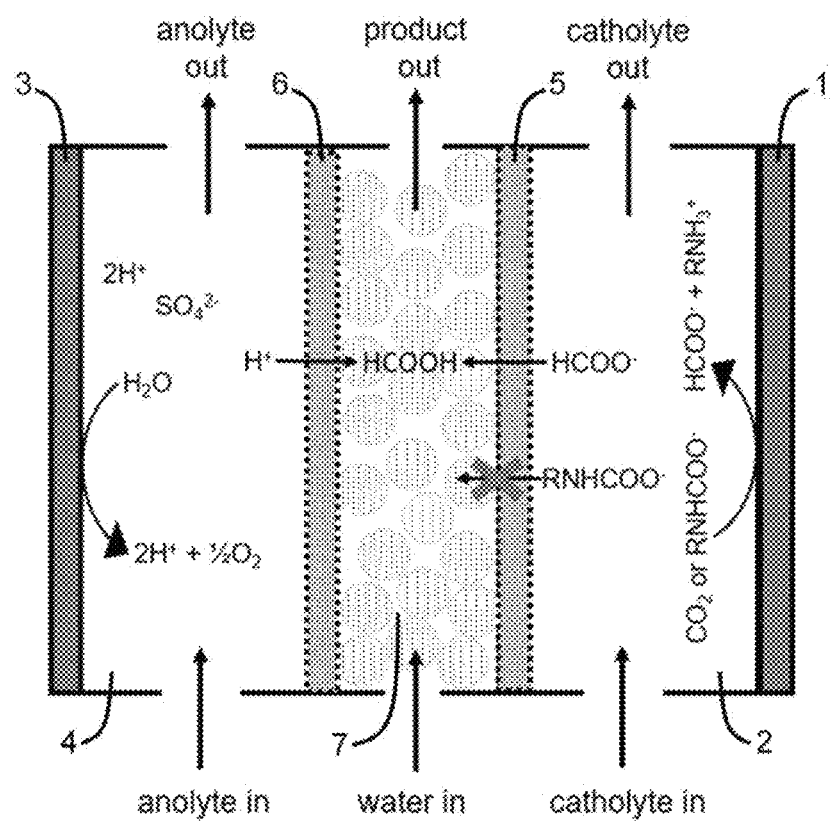
FIG. 2 depicts a schematic showing an example of a three-compartment electrochemical cell.

The three-compartment electrochemical cell comprises a cathode 1, a cathode compartment 2, an anode 3, an anode compartment 4, an anion exchange membrane 5, a cation exchange membrane 6, a product compartment (i.e. between 5 and 6), and an ion conducting medium 7. Herein, the product compartment is the preferred compartment into which reduced carbon dioxide product or product mixture is in-situ extracted. FIG. 2 schematically shows an example of a three-compartment electrochemical cell.

The anode and/or cathode of the electrochemical cell may be heated locally. By heating one or both electrodes carbon dioxide may be locally released from the carbon dioxide-rich absorbent and/or carbon dioxide-poor absorbent, and directly react on the electrode. Consequently, the reaction rate of carbon dioxide reduction may be accelerated.

The product compartment of the three-compartment electrochemical cell may comprise an aqueous phase with ion-exchange fillers, into which reduced carbon dioxide product or product mixture is extracted. Preferably, the aqueous phase comprises demineralised water. The fillers may positively influence electrical conductivity through the product compartment and reduce the resistance. Suitably, the extraction does not adversely affect reaction rates in the cathode compartment and/or anode compartment. The aqueous phase may be acidic or alkaline depending on the desired reduced carbon dioxide product or product mixture. In case of an acidic reduced carbon dioxide product or product mixture an acidic aqueous phase is preferred. The acidic environment is characterised by a pH value in the range of 0-7. The acidity, or basicity, has influence on the dissociation of the reduced carbon dioxide product or product mixture. The dissociation may occur in a reversible and/or irreversible manner. For example, a reduced carbon dioxide product at a pH value higher than its acid dissociation constant may be relatively more present as its conjugated base form. While the presence of a reduced carbon dioxide product at a pH value lower than its acid dissociation constant may be relatively more present as its conjugated acid. In particular, the preferred pH value is 6 or less, 5 or less, 4 or less, or 3 or less. A pH value of 3 or less is preferred as the reduced carbon dioxide product or product mixture comprising formic acid, oxalic acid, glycolic acid, glyoxylic acid and/or acetic acid is relatively more present as the conjugated acid. When the pH value of the product compartment is 6 or more, salts of formic acid, oxalic acid, and/or acetic acid may be formed.

Preferably, there is a continuous flow of aqueous phase through the product compartment, resulting in continuous removal of carbon dioxide reduction product or product mixture from the product compartment. The carbon dioxide reaction product or product mixture may be separated from the aqueous phase, and at least part of the aqueous phase may be recycled to the product compartment.

It is known to the skilled person that the generic term "filler" may refer to solid particles as well as solubilised materials, such as dissolved or dispersed materials. Ion-exchange fillers used in the art, for instance in WO-A-2014/100828, are typically solid, e.g. in the form of beads. According to the invention, the ion-exchange fillers may comprise at least one resin, at least one polymer, or combinations thereof. The fillers may be solid, such as beads, or solubilised, for instance dissolved and/or dispersed in the aqueous phase. Suitably, the use of solubilised fillers may result in reduced resistance when providing a continuous flow of aqueous phase through the product compartment by means of pumping. Furthermore, solubilised fillers may facilitate efficient separation of carbon dioxide reduction product or product mixture from the aqueous phase. Separation of reduced carbon product or product mixture from the aqueous phase may be performed using a membrane, for instance using a size exclusion membrane. Another advantage of using solubilised fillers is that the membranes may be placed closer together, resulting in improved electrical conductivity in the electrochemical cell.

The cathode compartment of the electrochemical cell may comprise a cathode material (or cathode), a catholyte, and/or at least one salt. The term catholyte is used for an electrolyte present in the cathode compartment.

The cathode material, or simply cathode, may include one or more different catalyst compositions that are either mixed or located in separate regions of the cathode in the cathode compartment.

The cathode structure may comprise one or more selected from the group consisting of platinum, palladium, rhodium, molybdenum, zirconium, niobium, osmium, gold, silver, titanium, copper, iridium, ruthenium, rhenium, mercury, lead, nickel, cobalt, zinc, cadmium, tin, iron, chromium, manganese, gallium, thallium, indium, antimony, and bismuth, oxides and/or alloys thereof, mixed metal oxides, dimensionally stable electrode (DSA®), stainless steel, austenitic steel, ferritic steel, duplex steel, martensitic steel, and carbon-based graphitic electrode. The preferred cathode structure to electrochemically reduce carbon dioxide to formic acid comprises one or more selected from the group consisting of copper, tin, indium, cadmium, bismuth, mercury, gold, palladium, silver, lead, zinc, and nickel, oxides and/or alloys thereof, and molecular catalysts, such as porphyrins of various metals. The preferred homogenous or metal-complex catalysts to reduce carbon dioxide to formic acid comprises one or more selected from the group consisting of hydrides, halides, or phosphines as ligands. The preferred cathode structure to electrochemically reduce carbon dioxide to oxalic acid comprises one or more selected from the group consisting of lead, indium, tin, palladium, zinc, titanium, niobium, chromium, iron, thallium, molybdenum, mercury, gallium, graphite, oxides and/or alloys thereof. The preferred homogenous, or metal-complex catalysts to reduce carbon dioxide to oxalic acid comprises one or more selected from the group consisting of low-valent d-block and f-block metal complexes, copper complexes, nickel complexes. The preferred cathode structure to electrochemically reduce carbon dioxide to acetic acid comprises one or more selected from the group consisting of copper, iron, and silver, oxides and/or alloys thereof. The catalyst may be present in the form of nanostructures, such as, nanoparticles and/or nanorods. In addition, the catalyst may be structured as a foam, felt and/or mesh.

In order to prevent the separator from contacting the cathode material and/or the anode material, a thin material may be applied to the cathode side and/or the anode side of the separator. The thin material may be of plastic origin.

For the electrochemical reduction of carbon dioxide, the cathode material may comprise a coating or a combination of coatings in a single or plurality of layers on the cathode. When a coating or a combination of coatings is present on the cathode, electrochemical reactions may not be inhibited. In time, when the electrode has lost part of its coating, the electrode may be regenerated with subsequent recoating applications. The coating may comprise one or more species selected from the group consisting of alkali metals, alkaline earth metals, lanthanides, actinides, transition metals, post-transition metals, and metalloids, oxides and/or alloys thereof, mixed metal oxides, and ion-conductive polymers. An example of such an ion-conductive polymer is sulfonated tetrafluoroethylene-based fluoropolymer-copolymer. The coating may typically be a very thin layer of several micrometers thick.

Figure 3:
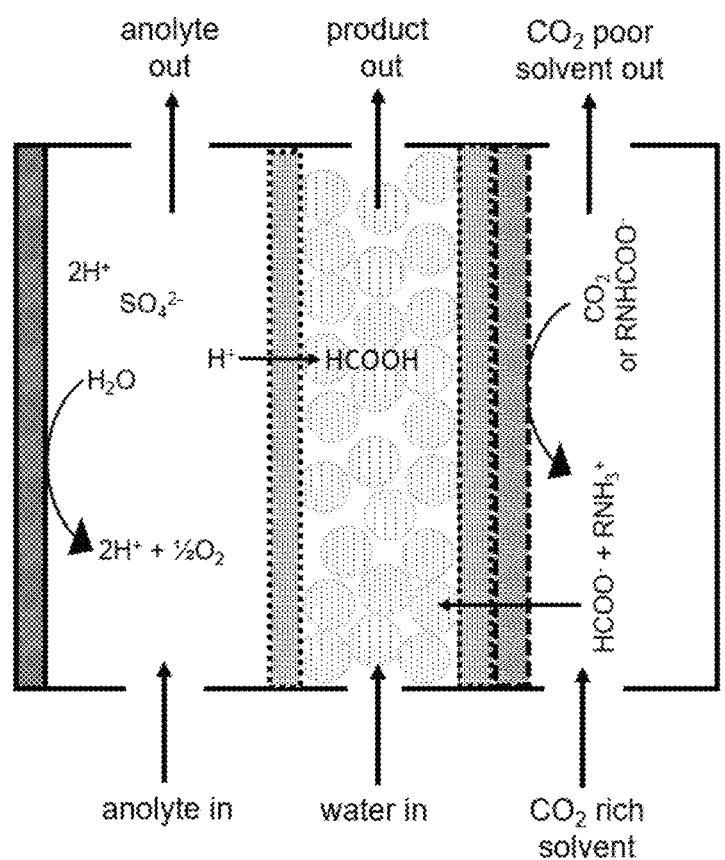
FIG. 3 depicts an electrochemical cell with a zero-gap type electrode.

Reduction of carbon dioxide may also be performed in a zero-gap type electrochemical cell. Zero-gap type electrochemical cells are known to the skilled person, and are described for instance in WO-A-2004/048643. A zero-gap type electrochemical cell is an electrochemical cell, wherein the anode and/or cathode is in direct contact with the membrane. An electrode which is in direct contact with the membrane is referred to as zero-gap type electrode. Preferably, the zero-gap type electrode is a porous electrode. In this arrangement, redox reactions take place at the interface between the zero-gap type electrode and the membrane. An electrochemical cell wherein the cathode is a zero-gap type electrode is illustrated in FIG. 3. The electrochemical reduction of carbon dioxide takes place at the interface between the cathode and the membrane. By using one or more zero-gap type electrodes, energy savings can be achieved, because voltage losses are minimised due to the reduced distance between the electrodes.

The cathode compartment of the electrochemical cell may comprise a fluid catholyte. In particular, the fluid catholyte is preferably liquid or gaseous, and most preferably the fluid catholyte is liquid. Suitable examples of catholytes may comprise monoethanolamine, diethanolamine, diisopropanolamine, N-methyldiethanolamine, diglycolamine, aminomethylpropanol, and/or ammonia, and water. To increase electrical conductivity and/or regulate the pH value of the catholyte, acids, bases, and/or salts may be added.

The catholyte may be substantially non-aqueous. A substantially non-aqueous catholyte is defined herein as a catholyte comprising less than 10 wt. % water, preferably less than 5 wt. % water, further preferably less than 3 wt. % water, such as less than 1 wt. % water. In an embodiment the catholyte is completely free from water.

Preferably, the catholyte comprises carbon dioxide absorbent. In this way, carbon dioxide can be reduced in the electrochemical cell, without the need to separate it from the carbon dioxide-rich absorbent prior to introduction in the electrochemical cell.

When a catholyte other than the absorbent, or capture solvent, is selected, the catholyte may comprise an organic and/or inorganic acid. An inorganic acid may be preferred since inorganic acids may be more inert compared to organic acids. Preferably, the inorganic acid may comprise one or more selected from the group consisting of hydrochloric acid, carbonic acid, nitric acid, phosphoric acid, sulphuric acid, boric acid, hydrofluoric acid, hydrobromic acid, perchloric acid, or hydroiodic acid.

When a basic, or alkaline, compound is selected to be added to the catholyte, the basic compound may comprise one or more selected from the group consisting of lithium hydroxide, sodium hydroxide, potassium hydroxide, rubidium hydroxide, cesium hydroxide, magnesium hydroxide, and calcium hydroxide.

In addition to or instead of acids and bases, the cathode compartment of the electrochemical cell may further comprise one or more salts. The salt may comprise one or more selected from the group consisting of alkali metal bicarbonates, carbonates, sulphates, phosphates, borates, and/or hydroxides, sodium sulphate, potassium chloride, sodium nitrate, sodium chloride, sodium fluoride, sodium perchlorate, potassium perchlorate, potassium silicate, calcium chloride, guanidinium cation, guanidinium derivatives, hydrogen cation, alkali metal cation, ammonium cation, alkylammonium cation, tetraalkyl ammonium cation, halide anion, alkylamine, borate, carbonate, nitrate, nitrite, phosphate, polyphosphate, perchlorate, silicate, sulphate, or hydroxide. In particular, potassium bicarbonate, sodium bicarbonate, sodium bromide, potassium bromide, and/or salts of the above mentioned acids and bases are preferred. The at least one salt may be present in the cathode compartment in a concentration in the range of 1-50% by total weight.

When one or more physical solvents are selected as the absorbent, the catholyte may comprise one or more physical solvents and/or at least one salt, or one or more physical solvents and/or at least one aqueous acid, base and/or salt. In case of non-aqueous soluble salts, the catholyte may comprise one or more selected from the group consisting of (various) dimethyl ethers of polyethylene glycol, N-methyl-2-pyrrolidone, methanol, alkylene carbonates such as propylene carbonate, acetone, sulpholane, dimethylsulphoxide, tetrahydrofuran, dimethylformamide, N-methyl-2-pyrrolidone, hexamethylphosphoramide, acetonitrile, dichloromethane, propylene carbonate, pyridine, hexafluoro-2-propanol, and/or ionic liquids comprising 1-butyl-3-methylimidazolium and hydrogen sulfate, trifluoroacetate, dihydrogen phosphate, chloride, nitrate, tetrafluoroborate, triflate and/or hexafluorophosphate.

Preferably, the catholyte or catholyte mixture is substantially or completely free of contaminants and other impurities. By introducing at least part of the carbon dioxide-rich absorbent into the cathode compartment of the electrochemical cell, in the absence of another catholyte in the cathode compartment, the production of undesirable by-products can be circumvented. Depending upon the absorbent, the electrolyte in the cathode compartment may be different to the electrolyte in the anode compartment of the electrochemical cell. The expression "catholyte" as used herein is meant to include the absorbent, carbon dioxide-rich absorbent, and/or carbon dioxide-poor absorbent.

The cathode compartment of the electrochemical cell may preferably comprise an alkaline, or basic, environment. Herewith, the catholyte in the cathode compartment has a pH value between 7-14. Therefore, conversion products of carbon dioxide, or reduced carbon dioxide product or product mixture, that may be present in the cathode compartment are likely to be present as their conjugate bases. When a product compartment is present, such as in the case of the three-compartment electrochemical cell, diffusion of the conversion products through a separator between the product compartment and cathode compartment, may result in obtaining their conjugate acids in the product compartment.

In case the environment in the cathode compartment is non-aqueous, it may not be possible to quantify the acidity or basicity of the environment using the pH scale. Other techniques, such as titration may be applied to determine whether the cathode compartment comprises an alkaline environment in which the conversion products of carbon dioxide, or reduced carbon dioxide product or product mixture are likely to be present as their conjugate bases.

The anode compartment of an electrochemical cell may comprise an anode material, an anolyte, and/or at least one salt. The term anolyte is used for an electrolyte present in the anode compartment.

The anode structure may also include one or more different catalyst compositions that are either mixed or located in separate regions of the anode structure in the anode compartment. The anode structure and/or catalyst compositions may comprise the material as mentioned above, concerning the cathode, cathode material, coating, and the catalyst compositions. The anode may comprise at least one electrocatalytic coating to be applied to the surface of the anode structure.

The anode compartment of the electrochemical cell may comprise a fluid anolyte. In particular, the fluid anolyte can be liquid or gaseous, and most preferably the fluid anolyte is liquid. The anolyte may include alkali metal hydroxides, such as lithium hydroxide, sodium hydroxide, potassium hydroxide, and ammonium hydroxide, inorganic acids such as sulphuric acid, and hydrochloric acid, organic acids such as methanesulphonic acid, and solutions of alkali halide salts such as sodium chloride, lithium bromide, and sodium iodide. Protic and aprotic organic and inorganic solvents may be used as well as the anolyte. Selection of the anolyte may be dependent by the desired reduced carbon dioxide product or product mixture. The anolyte may comprise the same above-mentioned material as the catholyte. When the separator is in contact with the anode, the anolyte may comprise (pure) water to produce oxygen.

The anode compartment of an electrochemical cell may further comprise at least one salt. The salt may preferably be an ionic complex comprising at least one alkali metal or alkaline earth metal and at least one anionic species. The salt may comprise one or more materials as mentioned above with the cathode compartment. The at least one salt may be present in the cathode compartment in a concentration in the range of 1-50% by total weight.

The electrochemical cell comprising both a cathode and anode compartment is optionally enriched with at least one salt. The salt may be added to the catholyte and/or anolyte prior to the carbon dioxide-rich absorbent entering the electrochemical cell in order to improve electrical conductivity. The salt may comprise one or more selected from the group consisting of alkali metal salt, alkaline earth salt, onium salt, aromatic amine, alkyl amine, or primary, secondary or tertiary amine salt, or hydrogen halide.

The method of the invention may be operated in batch, semi-continuously, or continuously. Batch processing has a lower risk of failure and is characterised by long reaction times, yet, lower production rates are a result. Continuous processing may be more efficient and lucrative, as products may be obtained in significantly larger amounts and require lower operating costs. It is preferred to perform the method of the invention in a continuous manner.

A sufficient electrical potential between an anode and a cathode in an electrochemical cell is applied for the cathode to reduce carbon dioxide into a reduced carbon dioxide product or product mixture in the carbon dioxide-rich absorbent, thereby providing a carbon dioxide-poor absorbent, and conjugate bases of the reduced carbon dioxide product or product mixture. An electrical potential is applied between the anode and the cathode to produce the first reduced carbon dioxide product or product mixture recoverable from the first region and the second reduced carbon dioxide product or product mixture recoverable from the second region. The electrical potential may be a direct current voltage. The energy source may be configured to implement a variable voltage source. The electrical potential between the anode and cathode may be 10 V or less. In particular, the preferred electrical potential is 0 V or more, and 9 V or less, 8 V or less, 7 V or less, 6 V or less, 5 V or less, 4 V or less, 3 V or less, 2 V or less, or 1 V or less. An electrical potential between 0-5 V is more preferred, and 0-3 V is most preferred. Higher electric potentials, such as more than 9 V, result in higher energy consumption and potentially in degradation of reactor components, such as electrodes.

A reduced carbon dioxide product or product mixture is collected via in-situ extraction into an acidic environment. At least part of the reduced carbon dioxide product or product mixture is collected. Preferably, all of the reduced carbon dioxide product or product mixture is collected via in-situ extraction.

The reduction of carbon dioxide into a reduced carbon dioxide product or product mixture may comprise one or more components selected from the group consisting of alkanes, alkenes, carbon monoxide, carboxylic acids, alcohols, aldehydes, and ketones. More specifically, the reduced carbon dioxide product or product mixture may comprise one or more components selected from the group consisting of carbon monoxide, methane, ethane, ethylene, methanol, formic acid, oxalic acid, glyoxylic acid, glycolic acid, acetic acid, tartaric acid, malonic acid, propionic acid, and acetaldehyde. Preferably, the reduced carbon dioxide product or product mixture comprises formic acid, acetic acid, oxalic acid, glycolic acid, tartaric acid, malonic acid, propionic acid, and/or glyoxylic acid. By controlling the electrical potential between the anode and the cathode, and/or by selecting a suitable cathode catalyst or suitable catholyte composition in the electrochemical cell, the desired product or products may be obtained.

Depending on the catholyte, formation of various side-products, such as gaseous $H_2$, might occur. When a substantially non-aqueous catholyte is used, selectivity toward oxalic acid, glyoxylic acid, and/or glycolic acid may be increased. Without wishing to be bound by theory, this may be caused by dimerisation of $CO_2^-$-radicals formed by reduction of $CO_2$.

Another effect of using a substantially non-aqueous catholyte may be that side-reactions leading to $H_2$ evolution are less favoured, thereby making $CO_2$ reduction more selective toward other products. These products may include oxalic acid, glyoxylic acid, glycolic acid, tartaric acid, malonic acid, and/or propionic acid.

If unsaturated molecules, such as alkenes or alkynes are present in a non-aqueous catholyte, $CO_2^-$-radicals formed by reduction of $CO_2$ may react with the unsaturated molecules, resulting in formation of a mixture of mono- and dicarboxylic acids.

In-situ extraction of reduced carbon dioxide product or product mixture is defined as in-process collecting reduced carbon dioxide product or product mixture. Suitably, this does not adversely affect the process of electroreduction of carbon dioxide in the electrochemical cell. Herewith, the process of electroreduction of carbon dioxide is preferably continuous, while at least part of the resulting reduced carbon dioxide product or product mixture is extracted. Preferably, reduced carbon dioxide products are extracted from the cathode compartment through an anion exchange membrane into the product compartment. Protons or other cations may be simultaneously extracted from the anode compartment through the cation exchange membrane into the product compartment.

By choosing the membrane, extraction of reduced carbon dioxide products into the product compartment can be performed selectively. For example, a mono- or divalent membrane may be used to enhance selectivity toward extraction of mono- or dicarboxylates, respectively.

The reduced carbon dioxide product mixture can be heated, which may lead to subsequent reactions. This enables changing the composition of the product mixture, depending on product demand. For example, heating the reduced carbon dioxide product formic acid may lead to the formation of carbon monoxide. Thermal decomposition of formic acid into carbon monoxide may occur at temperatures of 100° C. and higher, preferably 120° C. and higher, such as 150° C. and higher, but lower than 400° C., preferably lower than 300° C. The pressure at which thermal decomposition of formic acid may occur is 5 bars or more, such as 10 bars or more. Preferably, the pressure is 30 bars or less. For example, thermal decomposition of formic acid may take place at pressures of 10-30 bars. In order to avoid decarboxylation of the reduced carbon dioxide product mixture, thermal decomposition should be carried out in the absence of metals.

At least part of the reduced carbon dioxide product or product mixture is collected in an acidic environment. Collecting reduced carbon dioxide product or product mixture in an alkaline environment may also be performed. In particular, an acidic environment is preferred for collecting and extracting reduced carbon dioxide product or product mixture as it opens up further (direct) commercial use. The acidic environment may have a pH as described above.

A carbon dioxide-rich absorbent is formed by contacting a carbon dioxide-containing gas stream with an absorbent, thereby absorbing carbon dioxide from the carbon dioxide-containing gas stream. Herewith, contact between the carbon dioxide-containing gas stream and the absorbent can be achieved by imposing a flow or feed of the carbon dioxide-containing gas stream through a connector, such as piping, to a unit, such as a compartment or vessel comprising the absorbent. Preferably, all of the carbon dioxide-rich absorbent is introduced into the cathode compartment of the electrochemical cell as this may positively affect the economic viability of the method.

Part or all of the carbon dioxide-rich absorbent may be formed by contacting the carbon dioxide-containing gas stream with an absorbent in an absorber unit. Ideally, the absorber unit may be integrated in the method provided by the invention and is situated upstream to an electrochemical cell, and with which it may be connected.

The method of the invention may further comprise integrating a stripper unit downstream to an electrochemical cell. The stripper unit may be connected to the electrochemical cell and to the optionally present absorber unit and/or solely connected to the electrochemical cell.

A carbon dioxide-containing gas stream may be obtained from a pre-combustion process, combustion exhaust gas or flue gas of a combustion process, from a natural gas stream, from synthesis gas, from a carbon dioxide exhaust of for example a fermentative ethanol production plant, and/or any other carbon dioxide-containing source. Suitable examples of combustion processes include steam methane reforming (SMR), blast furnaces, and air-fired or oxygen-enhanced fossil fuel combustion processes such as power plants.

The carbon dioxide-containing gas stream may comprise between 3% and 90% by total volume of the gas of carbon dioxide. Preferably, the carbon dioxide-containing gas stream comprises between 8 vol. % and 85 vol. %. Other components that may be contained within the carbon dioxide-containing gas stream include, for example, other combustion by-products, such as water, methane, nitrogen, oxygen, argon, carbon monoxide, sulphur oxides, hydrogen sulphide, and nitrogen oxides.

The carbon dioxide-containing gas stream may be treated to remove contaminants or impurities that would negatively affect the invention. Suitable treatments may include molecular sieving through adsorption and/or absorption mechanisms, scrubbing, and non-thermal plasma treatment. Furthermore, moisture or water may be present in the carbon dioxide-containing gas stream. The presence of moisture or water may contribute positively to electrical conductivity.

Depending upon the source of the carbon dioxide-containing gas stream and type of absorbent, or capture solvent, it may require compression, for example by means of one or more compressors, to an absolute pressure from approximately 1 bar to approximately 200 bar.

When a chemical solvent or mixture of chemical solvents is selected as the absorbent, the absolute pressure may be between 1-50 bar. Preferably, the absolute pressure of is 50 bar or less, and 1 bar or more, 2 bar or more, 3 bar or more, 4 bar or more, 5 bar or more, 10 bar or more, 20 bar or more, 30 bar or more, or 40 bar or more. In case of monoethanolamine, the preferred absolute pressure may be 1-5 bar, while in case of N-methyldiethanolamine 1-50 bar is preferred.

When the absorbent is a physical solvent or solvent mixture, the absolute pressure may be between 1-200 bar. Preferably, the absolute pressure may is 20 bar or more, 30 bar or more, 40 bar or more, 50 bar or more, 60 bar or more, 70 bar or more, 80 bar or more, 90 bar or more, 100 bar or more, 110 bar or more, 120 bar or more, 130 bar or more, 140 bar or more, 150 bar or more, 160 bar or more, 170 bar or more, 180 bar or more, 190 bar or more, or 200 bar or more. An absolute pressure below 20 bar may result in a too low carbon dioxide concentration, wherewith the process efficiency may be adversely affected. At absolute pressures of 60 bar or more carbon dioxide may be liquid at room temperature. Liquid carbon dioxide may not adversely affect the absorption of carbon dioxide. Carbon dioxide at absolute pressures above 70 bar and temperatures above 30° C. may result in its supercritical state. Absolute pressures above 200 bar may require the process parts to be further fortified in order to handle such absolute pressures. More preferably, the absolute pressure of the carbon dioxide-containing gas stream is 20 bar or more and 180 bar or less, even more preferably 20 bar or more and 150 bar or less, and most preferably 20 bar or more and 140 bar or less. In particular, the initial absolute pressure of the carbon dioxide-containing gas stream is preferably maintained throughout the electrochemical reduction process. As a possible result, no (additional) pressure swing adsorption units are required. In view of the ideal gas law, elevated temperatures require the pressure to be elevated as well.

The absolute pressure in the electrochemical cell preferably resembles the above-mentioned pressure values. Depending upon the absolute pressure of the carbon dioxide-rich absorbent, it may require compression, for example by means of one or more compressors, to an absolute pressure from approximately 1 bar to approximately 200 bar. The absolute pressure difference between the cathode and anode compartment may preferably not be more than 5 bar. When the pressure difference exceeds 5 bar, the separator may be damaged.

The temperature in the electrochemical cell during the method of the invention is preferably −10° C. or more and 95° C. or less. A temperature below 0° C. may adversely affect the conversion of carbon dioxide to a reduced carbon dioxide product or product mixture. In addition, the low temperature range may be limited by the used absorbent and/or electrolyte(s) and their freezing points. In particular, the temperature may be 5° C. or more, and 70° C. or less, 60° C. or less, 50° C. or less, 40° C. or less, 30° C. or less, 20° C. or less, or 10° C. or less. When the temperature is more than 70° C., the partial pressure of carbon dioxide may increase significantly, because of reduced solubility. Herewith, the electrochemical cell may be fortified to cope with elevated pressures. Preferably the temperature is 5° C. or more, and 60° C. or less. A temperature of approximately 5° C. or more may not require active cooling of the electrochemical cell nor of the carbon dioxide-rich absorbent. A temperature above 60° C. may adversely influence the solubility of carbon dioxide, resulting in lower conversion and current efficiencies. In addition, one or more (external) heat exchangers may be required to control the temperature in case of a too high temperature.

Carbon dioxide from the carbon dioxide-containing gas stream is absorbed by an absorbent. The absorbent may comprise a chemical solvent, a mixture of chemical solvents, a physical solvent, a mixture of physical solvents, or a mixture of chemical and physical solvents (i.e. hybrid system). When the carbon dioxide-containing gas stream is for example shifted syngas, a physical solvent may be used. A chemical solvent may be used when the carbon dioxide-containing gas stream is for example flue gas.

When a physical solvent approach is selected, the absorbent comprises a physical solvent or a mixture or physical solvents. The solvent may be selected from the group consisting of Selexol™, Rectisol™, Sulfinol®, Amisol®, Genosorb®, dimethyl ethers of polyethylene glycol, N-methyl-2-pyrrolidone, methanol, and alkylene carbonates such as propylene carbonate. In particular, dimethyl ethers of polyethylene glycol, methanol, propylene carbonate, or any mixture thereof are preferred. More preferred are dimethyl ethers of polyethylene glycol, methanol, propylene carbonate or a mixture thereof, and most preferred may be dimethyl ethers of polyethylene glycol as its carbon dioxide absorption capacity is relatively high at elevated absolute pressure and temperature.

When a chemical solvent approach is selected, the absorbent comprises a chemical solvent or a mixture of chemical solvents comprising a chemical compound with at least one amine functional group and/or a hydroxyl functional group, of the type of alkanolamine. More specifically, the chemical solvent or mixture of chemical solvents may suitably comprise one or more selected from the group consisting of monoethanolamine, diethanolamine, N-methyldiethanolamine, dimethylethanolamine, diisopropanolamine, aminomethylpropanol, ammonia and diglycolamine. Preferably, the chemical solvent comprises monoethanolamine, as monoethanolamine is known to have a relatively high carbon dioxide absorption capacity and favourable absorption kinetics.

A carbon dioxide-poor absorbent is provided after the reduction of carbon dioxide from the carbon dioxide-rich absorbent. The carbon dioxide-poor absorbent has a carbon dioxide content of 75% or less, based on the total volume of the carbon dioxide-poor absorbent volume. A carbon dioxide content of more than 75 vol. % may adversely affect the cost and energy efficiency of the method of the invention. In addition, a carbon dioxide content of more than 75 vol. % may be the result of one or more deficiencies occurring during the process. The preferred carbon dioxide content of the carbon dioxide-poor absorbent is 60 vol. % or less, 50 vol. % or less, 40 vol. % or less, 30 vol. % or less, 20 vol. % or less, 10 vol. % or less, 8 vol. % or less, 5 vol. % or less, or 2 vol. % or less. When the carbon dioxide volume percentage is 40 vol. % or more the cost and energy efficiency of the method of the invention may be adversely affected. Preferably, the carbon dioxide content of the carbon dioxide-poor absorbent is 10 vol. % or less.

Remaining carbon dioxide in the carbon dioxide-poor absorbent may optionally be recirculated to the optional absorber unit or to a stripper unit to remove remaining carbon dioxide and its gaseous reduction products, and/or the cathode compartment of the electrochemical cell. Herewith, recirculated carbon dioxide-poor absorbent may be brought into contact with a carbon dioxide-containing gas stream and/or carbon dioxide-rich absorbent. The recirculated carbon dioxide-poor absorbent may uptake carbon dioxide and become carbon dioxide-rich absorbent.

The invention has been described by reference to various embodiments, and methods. The skilled person understands that features of various embodiments and methods can be combined with each other.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art. For the purpose of clarity and a concise description features are described herein as part of the same or separate embodiments, however, it will be appreciated that the scope of the invention may include embodiments having combinations of all or some of the features described.

EXAMPLE 1

Figure 4:
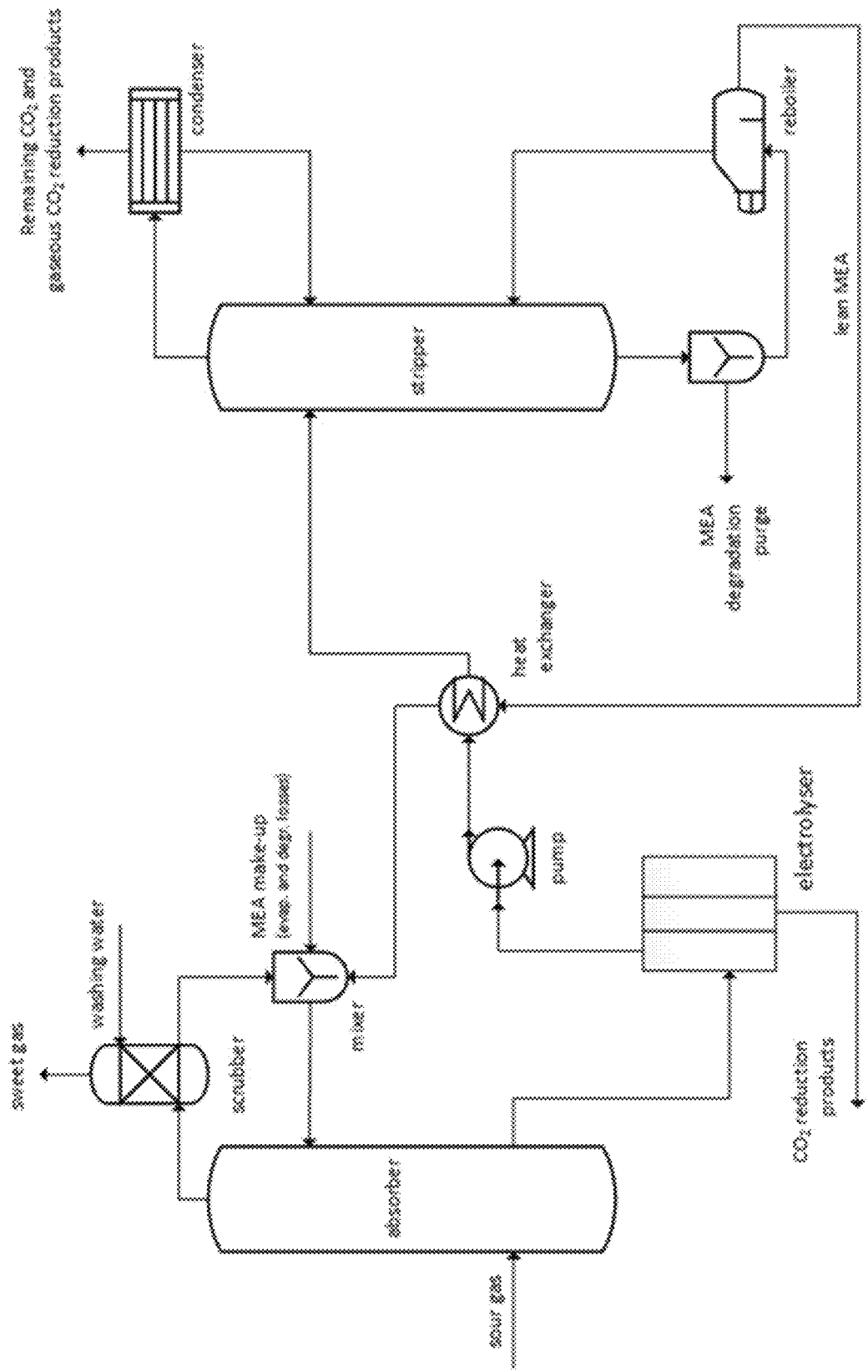
FIG. 4 depicts one example of an integrated monoethanolamine capture and electrochemical carbon dioxide utilisation process.

FIG. 4 shows an example of an integrated monoethanolamine capture and electrochemical carbon dioxide utilisation process. A gas stream (sour gas) is fed into the absorber. Carbon dioxide-poor gas leaves the absorber from the top. The carbon dioxide-poor gas is fed through a scrubber in case impurities (e.g. liquids and/or solids) need to be removed. The scrubber, or a second scrubber, can be situated before the gas stream enters the absorber. An aqueous monoethanolamine solution of 15-35 wt. % enters the top of the absorber at 32° C. The carbon dioxide-rich monoethanolamine leaves the absorber at 58° C. The carbon dioxide-rich absorber enters an electrochemical cell (electrolyser), wherein carbon dioxide is reduced to a reduced carbon dioxide product or product mixture.

One such example reaction is given in FIG. 2. Carbon dioxide or the carbamate, $RNHCO_2^-$, from a $CO_2$ reach amine stream reacts on surface of a cathode to produce formic acid and an amine. Formic acid is then selectively diffused into a middle compartment, where it is combined with protons diffused from an anode compartment to form formic acid solution in pure water in the middle compartment. On the anode an oxidation reaction takes place, for example, oxidation of water to oxygen and protons in acidic electrolyte of sulfuric acid. The carbamate preferably does not diffuse into the middle compartment, neither do amines.

Anode reaction: $2H_2O_{(l)} \rightarrow O_{2(g)} + 4H^+_{(aq)} + 4e^-$

Cathode reaction: $CO_{2(g)} + 2H^+ + 2e^- \rightarrow HCOO^-_{(aq)}$ or $RNHCO_2^- + 3H^+_{(aq)} + 2e^- \rightarrow HCOO^-_{(aq)} + RNH_3^+$ The anode and cathode are in-situ heated and/or cooled to a desirable temperature to induce local carbon dioxide release from the absorbent and to accelerate reaction rates and improve catalytic performance. The absorbent, carbon dioxide-poor absorbent, and gaseous carbon dioxide reduction product(s) are then pre-heated to 90-120° C. before being fed into the stripper, where the remainder of carbon dioxide is removed as well as the gaseous carbon dioxide reduction products are separated. The heat exchanger serves as a heat conservation device, and lowers total heat requirement of the process. The liquid reduced carbon dioxide product or product mixture is in-situ extracted in the electrochemical cell. The absorbent solution leaving the stripper is fed into a reboiler, where the remainder of all gases are removed. The resulting stripped absorbent is then fed into a mixer, wherein degraded monoethanolamine is removed. The monoethanolamine is subsequently fed into another mixer and into the absorber column.

EXAMPLE 2

Electrochemical reduction of carbon dioxide to formic acid was performed in a three-compartment electrochemical cell. Electrolysis was performed at ambient pressure in a filter-press type electrochemical reactor with plate electrodes: a Pt anode (10 cm²), a Sn cathode (10 cm²), and a Ag/AgCl reference electrode. The anode compartment was separated from the product compartment with a cation exchange membrane (Nafion®) and the cathode compartment was separated from the product compartment with an anion exchange membrane (Fumatech). Aqueous ammonia (1 M) was used both as chemical solvent for carbon dioxide and as catholyte. The following environments were used in the different compartments:

product compartment: 0.5 M $H_2SO_4$ (in MilliQ/Millipore water)

anode compartment/anolyte: 0.5 M $H_2SO_4$ (in MilliQ/Millipore water)

cathode compartment/catholyte: 1 M aqueous ammonia (in MilliQ/Millipore water), preloaded with $CO_2$.

A constant potential of −1.8 V vs Ag/AgCl was applied to cathode during electrolysis. The anolyte was kept at ambient temperature, whereas the catholyte was kept at 15° C. The cathode was locally heated to 85° C., in order to locally release $CO_2$ and electrochemically reduce it to formate. Formed formate-ions were in-situ extracted into the product compartment and combined with protons that were extracted from the anode compartment to form formic acid.

During the electrolysis, accumulation of formic acid was observed both in the cathode compartment and in the product compartment, and measured by HPLC. In addition, the formation of hydrogen gas at the cathode was observed. A current density of ca. 100 mA/cm² and a total cell voltage of ca. 5 V were measured.

The invention claimed is:

1. A method for electrochemically reducing carbon dioxide into a reduced carbon dioxide product or product mixture and in-situ extracting the reduced carbon dioxide product or product mixture in a three-compartment electrochemical cell which comprises
a cathode compartment;
an anode compartment;
a first separator which is a cation exchange membrane;
a second separator which is an anion exchange membrane, and
a product compartment, wherein each of the anode compartment, the cathode compartment and the product compartment are individual separate compartments, the method comprising:
a) introducing a carbon dioxide-rich absorbent into the cathode compartment;
b) applying an electrical potential between an anode and a cathode in the electrochemical cell sufficient for the cathode to reduce carbon dioxide into a reduced carbon dioxide product or product mixture in the carbon dioxide-rich absorbent, thereby providing a carbon dioxide-poor absorbent, and
c) collecting the reduced carbon dioxide product or product mixture via in-situ extraction, wherein the anode is separated from the cathode by more than one separator; wherein the product compartment of the three-compartment electrochemical cell is the compartment into which the reduced carbon dioxide product or product mixture is in-situ extracted.

2. The method of claim 1, wherein the method further comprises contacting a carbon dioxide-containing gas stream with an absorbent, thereby absorbing carbon dioxide from the carbon dioxide-containing gas stream to form the carbon dioxide-rich absorbent.

3. The method of claim 2, wherein the method further comprises recirculating at least part of the carbon dioxide-poor absorbent to absorb carbon dioxide from the carbon dioxide-containing gas stream.

4. The method of claim 2, wherein carbon dioxide is selectively absorbed by the absorbent.

5. The method of claim 2, wherein the absorbent comprises at least one physical solvent and/or at least one chemical solvent.

6. The method of claim 5, wherein the physical solvent comprises one or more selected from the group consisting of dimethyl ethers of polyethylene glycol, N-methyl-2-pyrrolidone, methanol, and alkylene carbonates.

7. The method of claim 5, wherein the physical solvent is substantially nonaqueous.

8. The method of claim 5, wherein the chemical solvent comprises at least one amine, at least one alkanolamine, ammonia, or a mixture thereof.

9. The method of claim 5, wherein the chemical solvent comprises one or more selected from the group consisting of monoethanolamine, diethanolamine, N-methyldiethanolamine, dimethylethanolamine, diisopropylamine, aminomethylpropanol, ammonia, and diglycolamine.

10. The method of claim 5, wherein the chemical solvent is substantially nonaqueous.

11. The method of claim 2, wherein the contacting of the carbon dioxide-containing gas stream with the absorbent is performed at a temperature of 5° C. or higher.

12. The method of claim 1,
wherein the method further comprises a step of adding at least one salt to the cathode compartment and/or anode compartment to improve electrical conductivity.

13. The method of claim 12, wherein the product compartment of the three-compartment electrochemical cell comprises an acidic environment into which the reduced carbon dioxide product or product mixture is in-situ extracted, and wherein the acidic environment has a pH range of 0-7.

14. The method according to claim 13, wherein the acidic environment comprises one or more ion-exchange filler(s).

15. The method of claim 14, wherein the ion-exchange filler(s) comprise at least one polymer.

16. The method of claim 14, wherein at least part of the ion-exchange filler(s) are dissolved or dispersed in the acidic environment.

17. The method of claim 1, wherein an absolute pressure is 1 bar or more and 200 bar or less.

18. The method of claim 1, wherein the reduced carbon dioxide product or product mixture comprises one or more selected from the group consisting of carbon monoxide, alkanes, alkenes, alcohols, carboxylic acids, salts of carboxylic acids, aldehydes, and ketones.

19. The method of claim 1, wherein the reduced carbon dioxide product or product mixture comprises one or more selected from the group consisting of formic acid, acetic acid, oxalic acid, glycolic acid, tartaric acid, malonic acid, propionic acid, glyoxylic acid, and salts thereof.

20. The method of claim 1, wherein the anode and/or the cathode in the electrochemical cell are heated.

21. The method of claim 1, wherein the anode and/or the cathode is a zero-gap type electrode.

\* \* \* \* \*